(12) United States Patent
Brueckl et al.

(10) Patent No.: US 12,246,403 B2
(45) Date of Patent: Mar. 11, 2025

(54) METHOD AND SYSTEM FOR APPLYING A SEAL TO A COMPONENT FOR A VEHICLE

(71) Applicant: Bayerische Motoren Werke Aktiengesellschaft, Munich (DE)

(72) Inventors: Thomas Brueckl, Thalmassing (DE); Juergen Gollwitzer, Deggendorf (DE); Wolfgang Thurmer, Pfatter (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/559,985

(22) PCT Filed: May 5, 2022

(86) PCT No.: PCT/EP2022/062107
§ 371 (c)(1),
(2) Date: Nov. 9, 2023

(87) PCT Pub. No.: WO2022/238223
PCT Pub. Date: Nov. 17, 2022

(65) Prior Publication Data
US 2024/0278364 A1    Aug. 22, 2024

(30) Foreign Application Priority Data
May 12, 2021   (DE) ...................... 10 2021 112 356.9

(51) Int. Cl.
*B23P 19/04*    (2006.01)
*B60J 10/00*    (2016.01)
*B60J 10/86*    (2016.01)

(52) U.S. Cl.
CPC ............. *B23P 19/047* (2013.01); *B60J 10/45* (2016.02); *B60J 10/86* (2016.02)

(58) Field of Classification Search
CPC ......... B23P 19/047; B23P 19/04; B23P 19/00; B23P 19/001; B23P 21/006; B23P 21/004;
(Continued)

(56) References Cited

U.S. PATENT DOCUMENTS 3,387,409 A * 6/1968 Gorys .................... B60J 5/0468
296/146.7
4,964,497 A * 10/1990 Bundo ................... B62D 65/02
198/346.2

(Continued)

FOREIGN PATENT DOCUMENTS

DE    20 2006 002 159 U1    5/2007
DE    10 2006 032 138 A1    8/2007
(Continued)

OTHER PUBLICATIONS

International Search Report (PCT/ISA/210) issued in PCT Application No. PCT/EP2022/062107 dated Sep. 6, 2022 (3 pages).
(Continued)

*Primary Examiner* — Lawrence Averick
(74) *Attorney, Agent, or Firm* — Crowell & Moring LLP (57) ABSTRACT

A method for applying a seal to a component includes conveying the component to a removal region while the component is held on a holding element and on a conveyor element. By a first robot, the holding element and the component are removed from the conveyor element, which is in the removal region, and moved to a rotary frame. By the first robot, the holding element and the component are supported on the rotary frame and are disposed in a first region of the rotary frame while the rotary frame is in a first rotational position. The rotary frame is rotated from the first rotational position to a second rotational position. The seal is applied to the component by a second robot while the component is supported on the holding element and on the
(Continued)

rotary frame and while the rotary frame is in the second rotational position.

10 Claims, 2 Drawing Sheets

(58) Field of Classification Search
CPC .. B23P 21/00; B60J 10/45; B60J 10/00; B60J 10/86; B60J 10/80; B62D 65/026; B62D 65/024; B62D 65/02; B62D 65/00; B62D 65/06
See application file for complete search history.

(56) References Cited

U.S. PATENT DOCUMENTS

| | | | |
|---|---|---|---|
| 4,996,756 A * | 3/1991 | Bright | B60J 10/45 29/243.58 |
| 5,065,486 A * | 11/1991 | Goedderz | B23P 19/047 292/35 |
| 5,068,952 A * | 12/1991 | Hennen | B23P 19/047 29/235 |
| 5,765,276 A * | 6/1998 | Pichot | B60J 10/45 29/717 |
| 5,950,503 A | 9/1999 | Amendolea | |
| 6,691,388 B1 * | 2/2004 | Kuppers | B23P 19/047 29/509 |
| 10,899,404 B2 * | 1/2021 | Perkins | B25J 15/0616 |
| 11,045,914 B2 * | 6/2021 | Brueckl | B62D 65/06 |
| 2019/0001450 A1 * | 1/2019 | Brueckl | B62D 65/06 |
| 2019/0225290 A1 * | 7/2019 | Perkins | B25J 11/005 |

FOREIGN PATENT DOCUMENTS

| | | |
|---|---|---|
| DE | 20 2006 005 835 U1 | 9/2007 |
| DE | 10 2008 008 306 A1 | 8/2009 |
| DE | 10 2018 211 560 A1 | 1/2020 |
| EP | 2 283 964 A1 | 2/2011 |
| JP | 61-119479 A | 6/1986 |
| JP | 10-194173 A | 7/1998 |
| WO | WO 2017/153154 A1 | 9/2017 |

OTHER PUBLICATIONS

German-language German Search Report issued in German Application No. 10 2021 112 356.9 dated Dec. 15, 2021, with partial English translation (7 pages).

* cited by examiner

METHOD AND SYSTEM FOR APPLYING A SEAL TO A COMPONENT FOR A VEHICLE

BACKGROUND AND SUMMARY

The invention relates to a method and to a plant for applying a seal to a component for a vehicle.

WO 2017/153154 A1 discloses a device for aligning a door seal when applying the door seal to a door of a motor vehicle. In addition, DE 20 2006 002 159 U1 discloses an application device for fixing strip elements on edges of disk-shaped elements. In addition, DE 10 2006 032 138 A1 discloses a method for applying a seal to a partial surface of a component.

It is an object of the present invention to provide a method and a plant such that seals can be applied, that is to say fixed, to components for vehicles particularly favorably in terms of time and costs.

A first aspect of the invention relates to a method for applying, that is to say fixing, a seal made for example of an elastically deformable material, such as rubber, to a component for a vehicle, in particular for an automobile which is preferably in the form of a passenger car. In order to be able to apply, that is to say fix, the seal to the component particularly favorably in terms of time and costs, in a first step of the method the component is conveyed into a removal region by means of a conveyor element while or in that the component is held on a holding element, which is separate from the component and separate from the conveyor element, and is held on the conveyor element via the holding element, that is to say by way of the holding element. To this end, for example, the holding element, also referred to as base element, is fastened to the conveyor element so as to be reversibly detachable, that is to say nondestructively detachable. In particular, it is conceivable that the holding element is suspended from the conveyor element or is suspended in the conveyor element. The feature that the holding element is held on the conveyor element so as to be nondestructively detachable is to be understood as meaning that the holding element can be detached from the conveyor element and then reattached to the conveyor element and as a result can be held on the conveyor element without the conveyor element or the holding element being destroyed and/or damaged.

The holding element is for example a hanger, also referred to as overhead hanger. In particular, it is conceivable for the component, which is for example in the form of a door, in particular a side door, to be held on the holding element so as to be reversibly detachable, that is to say is fastened to the holding element so as to be reversibly detachable, with the result that, for example, the component can be detached from the holding element and reattached to the holding element, that is to say can be fastened to the holding element so as to be reversibly detachable, without the holding element or the component being destroyed and/or damaged. In particular when the holding element is in the form of a hanger, in particular an overhead hanger, the component is held on the holding element in particular so as to be reversibly detachable, that is to say connected to the holding element so as to be reversibly detachable, for example in such a way that the component is suspended from the holding element or suspended in the holding element. Since the component is held on the holding element in particular directly, and the holding element is held on the conveyor element in particular directly, the component is held on the conveyor element via the holding element. If the conveyor element is then moved, in particular in space and/or relative to a floor of a building in which the seal is applied, the holding element and the component are moved conjointly with the conveyor element, that is to say are conveyed by means of the conveyor element.

The conveyor element is for example a carriage. In particular, the conveyor element can be a suspended conveyor element, in particular a suspended carriage, wherein the conveyor element is suspended for example from a ceiling of the building. In this respect, the ceiling is spaced apart from the floor in the vertical direction. In particular, the conveyor element may be a carriage of an overhead conveyor, in particular an electric overhead conveyor, with the result that it is conceivable in particular for the conveyor element to be moved electrically, in order as a result to convey the holding element, also referred to as main element, and the component electrically. For example, the component is moved from a region which is different than the removal region and in particular is spaced apart from the removal region to the removal region by means of the conveyor element. The region and the removal region are for example sections of an interior space of the building, the interior space of which may be delimited upwardly in the vertical direction by the ceiling and downwardly in the vertical direction by the floor.

In a second step of the method, a first robot is used to remove the holding element and, via the holding element, that is to say by way of the holding element, the component held on the holding element from the conveyor element located in the removal region and to move them to a rotary frame, also referred to as turntable or in the form of a turntable. For example, the robot interacts with the holding element in particular directly, in particular in such a way that the holding element is held on or fastened to the first robot in particular directly so as to be reversibly, that is to say nondestructively, detachable. If the first robot then moves, in particular in space, the holding element held on the first robot in particular so as to be reversibly detachable is moved conjointly with the first robot, in particular moves around in space. Since in the process the component is held on the holding element in particular so as to be reversibly detachable, the component is moved conjointly with the holding element and with the robot, with the result that the component is moved by means of the robot via the holding element, in particular in space.

In a third step of the method, by means of the robot the holding element and, via the holding element, the component held on the holding element are supported on the rotary frame and as a result are disposed in a region of the rotary frame also referred to as first region while the rotary frame is in a first rotational position of the rotary frame. The feature that the holding element and, via the holding element, the component held on a holding element are supported on the rotary frame should be understood in particular to mean that for example the holding element is supported on the rotary frame, in particular directly. Since the component is held on the holding element, the component is supported on the rotary frame via the holding element. The supporting operation may in particular include the fact that the holding element and, by way of the holding element, the component are fastened to, that is to say held on, the rotary frame to as to be nondestructively detachable.

In a fourth step of the method, the rotary frame and as a result the holding element and the component held on the holding element are rotated from the first rotational position to a second rotational position. In other words, the rotary frame is rotated from the first rotational position to a second rotational position of the rotary frame while the holding element and, by way of the holding element, the component are supported on the rotary frame, with the result that the holding element and the component are rotated conjointly with the rotary frame. By rotating the rotary frame and thus the holding element and thus the component from the first rotational position to the second rotational position of the rotary frame, the component is for example moved from a collection region to an application region. The collection region and the application region are for example further sections of the abovementioned interior space.

In a fifth step of the method, the seal is applied to the component, that is to say fixed to the component, by means of a second robot, which is provided in addition to the first robot, while the component is supported, in particular held, on the holding element and, via the holding element, on the rotary frame and while the rotary frame is in the second rotational position and in particular while the holding element and the component held thereon are in the application region. Preferably, the second robot is provided in addition to the first robot and is a device external to the first robot, wherein the robots are preferably spaced apart from one another.

The use of the second robot and the rotary frame makes it possible to provide a multiplicity of components with respective seals particularly favorably in terms of time and costs. In other words, it is possible to apply, that is to say to fix, a respective seal to the respective component in a particularly short cycle time. Since the component is handled by way of the holding element assigned to the component, in particular in such a way that the holding element remains on the component but not on the robot, the component can be handled particularly easily and favorably in terms of costs. In particular, it is provided that the first robot is firstly detached and moved away from the holding element and also from the component while the component is held on the conveyor element by way of the holding element. In order to move the holding element from the conveyor element to the rotary frame, the first robot is made to interact with the holding element in particular directly, in particular while the robot is completely spaced apart from the component, that is to say does not touch the component. Therefore, the component can be handled by means of the first robot completely or exclusively by way of the holding element. Direct interaction of the first robot with the component is not necessary and preferably is not provided. After the holding element and the component have been disposed in the abovementioned region of the rotary frame, for example by means of the first robot, for example the first robot is detached from the holding element again and removed, whereupon the rotary frame is rotated from the first rotational position to the second rotational position. It is therefore evident that the holding element does not remain fixedly on the first robot, but as it were is handled together with the component, in particular in such a way that the component is not handled directly by means of the first robot, rather the holding element is directly handled by means of the first robot, with the result that the component is handled, that is to say manipulated, by means of the first robot via the holding element. This makes it possible to be able to move, that is to say handle, different components or different derivatives or structural variants of the component by means of the same first robot, in particular by means of this very same first robot, in particular in such a way that for example the respective structural variant of the respective component is handled by means of the first robot via a respective holding element assigned to the respective structural variant and specific to the structural variant. This makes it possible to avoid the need to use a large number of different grippers which are provided specially for the respective structural variants, are fastened or to be fastened to the first robot, and are intended for handling the respective structural variants. In particular, it is possible to avoid a situation in which, for example, when a first one of the structural variants has been handled via a first gripper fastened to the first robot and then a second one of the structural variants is to be handled, the first gripper, which is initially fastened to the first robot, needs to be changed over for a second gripper. To this end, firstly the first robot must be brought to a standstill, whereupon the first gripper would have to be detached from the first robot and thereupon the second gripper would have to be fastened to the first robot. This would be very intensive in terms of time and costs and can now be avoided by virtue of the invention.

The component is also referred to as first component, the conveyor element is also referred to as first conveyor element, the holding element is also referred to as first holding element and the region of the rotary frame is also referred to as first region of the rotary frame. Moreover, the aforementioned seal is also referred to as first seal. In particular, the invention makes it possible to fix the first seal to the first component, that is to say to apply it to the first component, while for example the rotary frame is charged with a second component, to which a second seal is to be applied, that is to say while for example a second component is indirectly supported on the rotary frame by means of the first robot, in particular by way of a second holding element. This makes it possible to provide a particularly large number of components with seals.

Applying the seal to the component is to be understood as meaning that the seal is fastened to the component. In other words, the component is provided with the seal. For example, the seal is attached to a corresponding sealing surface of the component, that is to say is applied to the sealing surface. The sealing surface is for example at least part of a surface of the component.

In order to apply the seal to the component, an in particular mobile application head which can be moved around, in particular in space, by means of the second robot is disposed for example on the second robot. For example, the seal is provided and applied to the component, in particular attached to the sealing surface, by means of the application head. Since for example the application head is moved in space and relative to the component by means of the second robot, in particular while the component remains stationary, in order to apply the seal, the application head is also referred to as mobile head or mobile application head. For example, the seal is applied to the component by adhesive bonding and/or plugging in. For example, the seal, in particular a plug-in receptacle of the seal, is plugged onto a corresponding flange, in particular plug-in flange, of the component. Therefore, the flange is at least partially plugged into the plug-in receptacle, as a result of which the seal can be applied, that is to say fixed, to the component. Since the invention makes it possible to dispense with special grippers for handling the component or different structural variants of the component, the invention enables gripper-free application of seals to components, as a result of which a particularly large number of components can be provided with respective seals favorably in terms of time and costs.

In order to be able to apply the seal particularly favorably in terms of time and costs, in one embodiment of the invention is it provided that in a sixth step of the method a second component, in particular separate from the first component, is conveyed to the removal region, in particular from the region which is different than or spaced apart from the removal region, by means of a second conveyor element, in particular spaced apart from the first conveyor element, while the second component is held on a second holding element which is separate from the second component and separate from the second conveyor element, and is held on the second conveyor element via the second holding element. The preceding and following statements relating to the first component, relating to the first conveyor element and relating to the first holding element can readily also be transferred to the second component, the second holding element and the second conveyor element, and vice versa.

In a seventh step of the method, the second holding element and, via the second holding element, the second component, which is held on the second holding element in particular so as to be reversibly detachable, by means of the first robot are removed from the second conveyor element located in the removal region and moved to the rotary frame, in particular while the rotary frame is in the second rotary position. In an eighth step of the method, by means of the first robot the second holding element and, via the second holding element, the second component held on the second holding element are supported on the rotary frame and thereby disposed in a second region of the rotary frame that is opposite the first region of the rotary frame while the rotary frame is in the second rotational position and while the first seal is applied to the first component by means of the second robot. In this embodiment, steps are therefore at least partially carried out parallel in time, since the rotary frame is charged with the second holding element and the second component while the first component is provided with the first seal and while the first component is supported, in particular held, on the rotary frame via the first holding element.

A further, particularly advantageous embodiment of the invention provides that, in a ninth step of the method, after applying the first seal to the first component, the rotary frame and thus the first holding element, the second holding element, the first component and the second component are rotated from the second rotational position to the first rotational position. In other words, after applying the first seal to the first component, the rotary frame is rotated from the second rotational position to the first rotational position, as a result of which the holding elements and the components held thereon are rotated conjointly with the rotary frame.

In a tenth step of the method, a second seal is applied to the second component by means of the second robot while the second component is held on the second holding element and, via the second holding element, on the rotary frame and while the rotary frame is in the first rotational position. The preceding and following statements relating to the first seal can be readily transferred to the second seal, and vice versa. It is evident that the use of the rotary frame makes it possible to use the first robot to handle the holding elements and thus the components and to use the second robot to apply the seals, as a result of which the seals can be applied particularly favorably in terms of time and costs.

In a further, particularly advantageous embodiment of the invention, in an eleventh step of the method, by means of the first robot the first holding element and, via the first holding element, the first component, which is held on the first holding element and to which the first seal is applied, is removed from the rotary frame, which is in the first rotational position, and moved to the first conveyor element, which is in a return region different than the removal region, while the second seal is applied, that is to say fixed, to the second component by means of the second robot. In a twelfth step of the method, the first holding element and/or, via the first holding element, the first component, which is held on the first holding element and to which the first seal is applied, are/is disposed on the first conveyor element by means of the first robot while the first conveyor element is in the return region. After this, by means of the first conveyor element the first holding element and the first component provided with the first seal can be conveyed out, in particular from the return region, and conveyed to a further region. Preferably, the return region is spaced apart from the removal region and/or a region different than the removal region, wherein the return region can preferably be further sections of the aforementioned interior space, like the further region. This embodiment enables further parallelization in time of work steps, as a result of which the seals can be applied particularly favorably in terms of time and costs.

In a further, particularly advantageous embodiment of the invention, in a thirteenth step of the method, after applying the second seal to the second component, the rotary frame and, as a result, the second holding element and the second component are rotated from the first rotational position to the second rotational position. In a fourteenth step of the method, by means of the first robot the second holding element and, via the second holding element, the second component, which is held on the second holding element in particular so as to be reversibly detachable and to which the second seal is applied, are removed from the rotary frame, which is in the second rotational position, and moved to the second conveyor element, which is in the return region different than the removal region. In a fifteenth step of the method, by means of the first robot the second holding element and, via the second holding element, the second component, which is held on the second holding element and to which the second seal is applied, are disposed on the second conveyor element while the second conveyor element is in the return region. The invention makes it possible to apply seals using an at least substantially continuously running process in which it is also possible to provide different structural variants or derivatives of the component, that is to say different components, with respective seals without needing to use different grippers on the robots and thus without needing to remove grippers from the robots and refasten them to the robots. This makes it possible to apply a particularly large number of seals particularly favorably in terms of time and costs.

Preferably, it is provided that the aforementioned steps of the method are carried out in the specified sequence, that is to say in the sequence they have been named or numbered. Therefore, it is preferably provided that the second step is carried out after the first step, the third step is carried out after the second step, the fourth step is carried out after the third step, the fifth step is carried out after the fourth step, the sixth step is carried out after the fifth step, the seventh step is carried out after the sixth step, the eighth step is carried out after the seventh step, the ninth step is carried out after the eighth step, the tenth step is carried out after the ninth step, the eleventh step is carried out after the tenth step, the twelfth step is carried out after the eleventh step, the thirteenth step is carried out after the twelfth step, the fourteenth step is carried out after the thirteenth step, and the fifteenth step is carried out after the fourteenth step.

Where reference is made below to the conveyor element, the holding element, the component and the seal, this is to be understood as meaning—unless otherwise indicated—the first conveyor element and the second conveyor element, the first holding element and the second holding element, the first component and the second component, and the first seal and the second seal. In other words, the preceding and following embodiments relating to the conveyor element, the holding element, the component and the seal can be readily transferred both to the first conveyor element, the first holding element, the first component and the first seal and to the second conveyor element, the second holding element, the second component and the second seal, and vice versa.

In order to be able to apply the seal particularly favorably in terms of installation space, time and costs, in a further configuration of the invention it is provided that the rotary frame is rotated by at least 90 degrees, in particular by at least or exactly 180 degrees, in order to rotate the rotary frame from the first rotational position to the second rotational position and from the second rotational position to the first rotational position.

A further embodiment is distinguished in that the component used is a door, in particular a side door. This embodiment is based on the finding that, in the context of production, in particular mass production, of vehicles, such as automobiles, and very particularly passenger cars, the application of seals to doors, in particular side doors, constitutes a significant challenge and is usually associated with a not inconsiderable outlay in terms of time and costs. The invention now makes it possible to be able to provide doors, such as side doors, with seals, also referred to as door seals, particularly favorably in terms of time and costs, in particular even when different derivatives or structural variants of a door are to be provided with respective seals in a plant or inside the aforementioned interior space, and in this respect in particular by means of the first robot and by means of the second robot.

In a further configuration of the invention, it is provided that the rotary frame is rotated about a vertical axis of rotation and the rotary frame is rotated from the first rotational position to the second rotational position and from the second rotational position to the first rotational position. This makes it possible to present a particularly straightforward application of seals which is thus particularly favorable in terms of time and costs.

Lastly, it has been shown to be particularly advantageous when the conveyor element is moved rectilinearly, that is to say along a straight line and preferably horizontally from the removal region to the return region. This makes it possible to present an application of seals which is particularly favorable in terms of costs.

A second aspect of the invention relates to a plant for applying a seal to a component for a vehicle. In this respect, the plant is designed to carry out a method according to the first aspect of the invention. Advantages and advantageous configurations of the first aspect of the invention are to be considered as advantages and advantageous configurations of the second aspect of the invention, and vice versa.

Further details of the invention will become apparent from the following description of a preferred exemplary embodiment with the associated drawings.

DETAILED DESCRIPTION OF THE DRAWINGS

In the figures, elements that are the same or have the same function are provided with the same reference signs.

Figure 1:
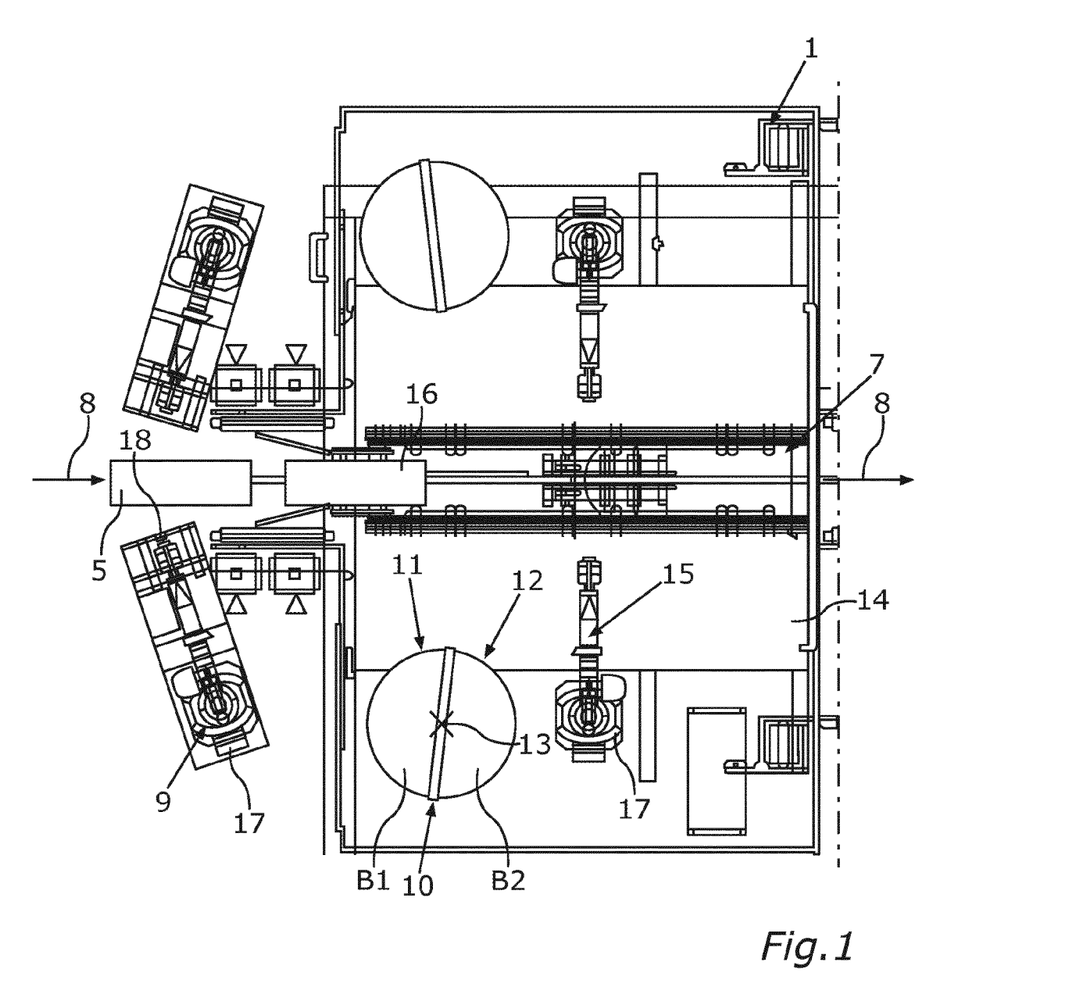
FIG. 1 shows a schematic plan view of a plant for applying seals to components for vehicles.
Figure 2:
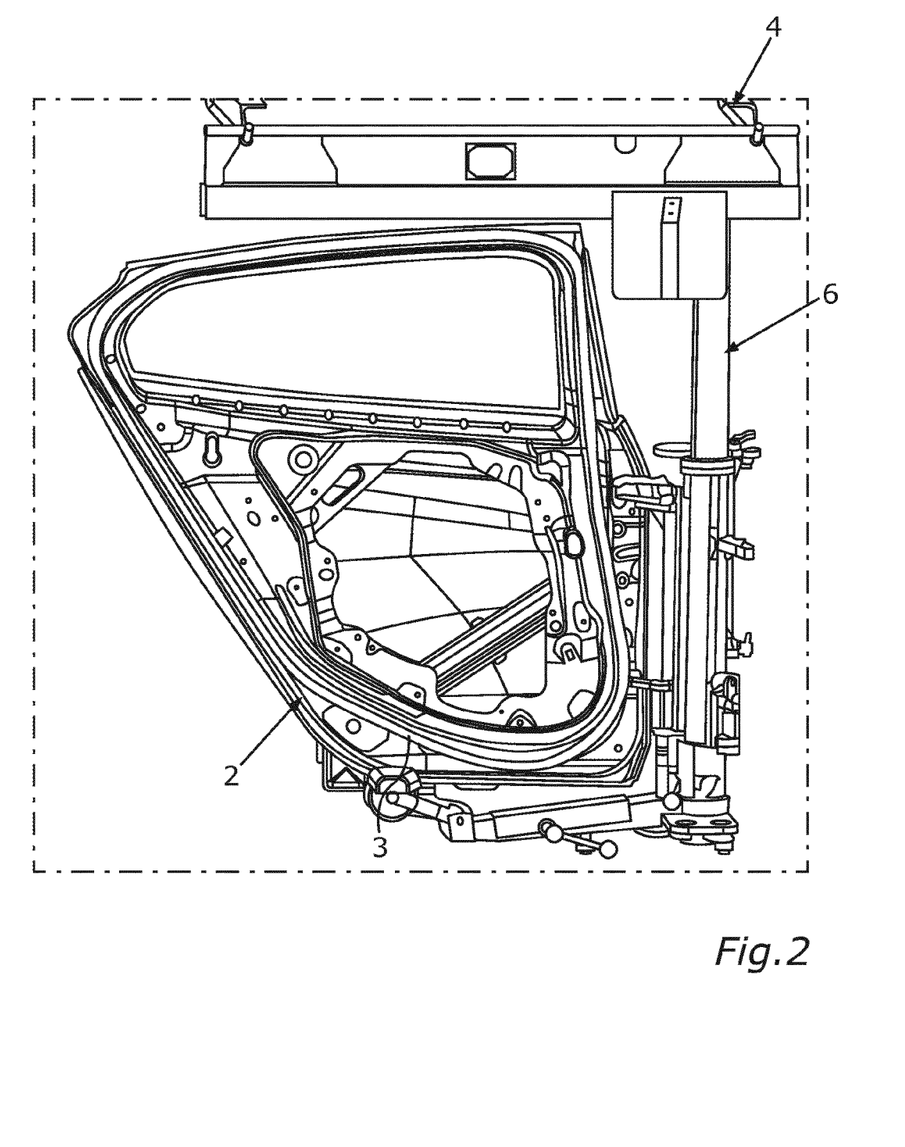
FIG. 2 shows a schematic side view of a holding element, in the form of an overhead hanger, of the plant.

FIG. 1 shows a schematic plan view of a plant 1 for applying seals to components for vehicles. This means that the plant 1 is used to carry out a method for applying the seals to the components. The respective component is used to produce the respective vehicle. The respective vehicle is an automobile, in particular a passenger car. In its finished state, the respective vehicle has a structure in particular in the form of a self-supporting body, which delimits at least one, in particular lateral, door opening. FIG. 2 shows one of the components in a schematic side view. As can be seen from FIG. 2, the respective component is a door, which is in the form of a side door 2 and in the finished state of the vehicle is held movably, in particular pivotably, on the structure and is assigned to the aforementioned door opening. In the finished state of the vehicle, the side door 2 can be moved, in particular pivoted, between a closed position and at least one open position relative to the structure. In the closed position, at least one section of the door opening is covered by the side door and thus closed. In the open position, the side door 2 opens up the section, with the result that a person, such as the driver of the vehicle, can enter the vehicle, in particular its interior space, and exit the vehicle, in particular its interior space, via the opened-up section.

In FIG. 2, the seal denoted with 3 in FIG. 2 can also be seen, the seal being applied, that is to say fixed, to the side door 2. The seal 3 is a door seal, by means of which the side door 2 can be sealed or is to be sealed with respect to the structure in the closed position. The seal 3 is also referred to as seal element or sealing element and is made from an elastically deformable material, in particular from rubber. The application of the seal 3 to the side door 2 is to be understood as meaning that the seal 3 is fixed to the side door 2, that is to say is fastened to the side door 2. For example, during the application operation, the seal 3 is attached to a corresponding sealing surface of the side door 2, that is to say the seal is applied to the sealing surface. In the following text, the method and the plant 1 are described with reference to the side door 2 and the seal 3, wherein the side door 2 is also referred to as first side door and the seal 3 is also referred to as first seal.

The side door 2 is conveyed to a removal region 5 (FIG. 1) of the plant 1 by means of a first conveyor element 4 of the plant 1 while the side door 2 is held on a holding element, which is separate from the side door 2 and separate from the conveyor element 4 and in the present case is in the form of an overhead hanger 6, and is held on the conveyor element 4 via the overhead hanger 6. The conveyor element 4 is a conveyor element of a conveyor device 7 (FIG. 1), which may be in the form for example of an overhead conveyor, in particular an electric overhead conveyor. In particular, the conveyor element 4 is a carriage of the conveyor device 7.

As illustrated in FIG. 1 by arrows 8, the conveyor element 4 is moved, in particular rectilinearly, relative to a floor and a ceiling of the plant 1 while the overhead hanger 6 is held on the conveyor element 4, in particular directly, and the side door 2 is held on the overhead hanger 6, in particular directly. As a result, the overhead hanger 6 and the side door 2 are conveyed to the removal region 5 by means of the conveyor element 4. The side door 2 may be a front door or a rear door. For example, at least or exactly two diametrically opposite side doors, in particular front doors or rear doors, are conveyed to the removal region 5 by means of the conveyor element 4, wherein one of the diametrically opposite side doors is the side door 2. The preceding and following statements relating to the side door 2 can readily also be transferred to the other, diametrically opposite side door, and vice versa. The side door 2 is secured to its overhead hanger 6, also referred to as overhead door hanger, by way of its door hinges and by way of a mechanical pressing roller. In particular, the side door 2 is secured in or on the overhead hanger 6. The overhead hanger 6 and thus also the other overhead hanger, which cannot be seen in the figures and on which the other side door is held in particular so as to be reversibly detachable, are suspended, in particular so as to be freely accessible, in the conveyor element 4, which is for example in the form of a carriage, and thus held on the conveyor element 4 so as to be reversibly detachable, that is to say nondestructively detachable. Therefore, when the conveyor element 4 is moved relative to the floor, the overhead hanger and thus the side doors are moved conjointly with the conveyor element 4 relative to the floor. In this way, the side doors can be moved to the removal region 5 by means of the conveyor element 4.

Since the overhead hanger 6 is held on the conveyor element 4, in particular directly, and the side door 2 is held on the overhead hanger 6, in particular directly, the side door 2 is held on the conveyor element 4 via the overhead hanger 6, with the result that the side door 2 is conveyed to the removal region 5 by means of the conveyor element 4 while the side door 2 is held on the overhead hanger 6 and, by way of the latter, on the conveyor element 4.

By means of a first robot 9 of the plant 1, the overhead hanger 6 and, via the overhead hanger 6, the side door 2, which is held on the overhead hanger 6 in particular so as to be nondestructively detachable, are removed from the conveyor element 4, which is in the removal region 5, and moved to a rotary frame 10 of the plant 1, which rotary frame is in the form of a turntable or is also referred to as turntable. To this end, for example, the first robot 9, which is initially detached and spaced apart from the overhead hanger 6, is made to interact, in particular directly, with the overhead hanger 6. This is to be understood as meaning in particular that, for example, the first robot 9 touches the overhead hanger 6, in particular directly. For example, the overhead hanger 6 is secured to the robot 9, in particular directly, so as to be reversibly detachable, that is to say nondestructively detachable. For example, the overhead hanger 6 is fastened to a manipulator 18 of the first robot 9, in particular so as to be reversibly detachable. If the manipulator 18 is then moved around in space, the overhead hanger 6 which is fastened to the manipulator 18, in particular so as to be reversibly detachable, is moved around, in particular in space, by means of the first robot 9, wherein the side door 2 held on the overhead hanger 6 is moved conjointly with the overhead hanger 6.

In this way, by means of the first robot 9 the overhead hanger 6 and, by way of the latter, the side door 2 are moved and in the process moved from the conveyor element 4, which is in the removal region 5, to the rotary frame 10.

By means of the first robot 9, the overhead hanger 6 and, via the overhead hanger 6, the side door 2 held on the overhead hanger 6 are supported on the rotary frame 10 in such a way that the overhead hanger 6 and the side door 2 are disposed in a first region B1 of the rotary frame 10 while the rotary frame 10 is in a first rotational position, shown in FIG. 1. In the first rotational position of the rotary frame 10, the first region B1 of the rotary frame 10 is disposed in a transfer region 11 while a second region B2, opposite the first region B1, of the rotary frame 10 is disposed in an application region 12. The rotary frame 10 may be rotated about a vertical axis of rotation 13, in particular relative to the floor, denoted by 14 in FIG. 1, of the plant 1, in particular by at least or exactly 180 degrees. If the rotary frame 10 is rotated relative to the floor 14 by 180 degrees about the axis of rotation 13 starting from the first rotational position, the rotary frame 10 is rotated from the first rotational position to the second rotational position as a result. In the second rotational position, the region B2 is in the transfer region 11, also referred to as collection region, and in the second rotational position the region B1 is in the application region 12. The transfer region 11 and the application region 12 are respective sections of an interior space of the plant 1, the interior space of which is delimited downward in the vertical direction by the floor 14 and for example vertically upward by a ceiling of the plant 1. For example, the conveyor element 4 is suspended from the ceiling and spaced apart from the floor 14.

After the overhead hanger 6 and the side door 2 have been disposed in the region B1 and in the collection region (transfer region 11), the rotary frame 10 is rotated by 180 degrees about the axis of rotation 13 and rotated from the first rotational position to the second rotational position as a result. Since in the process the overhead hanger 6 and the side door 2 are disposed in the region B1 and supported on the rotary frame 10, in particular supported on the rotary frame 10 so as to be nondestructively detachable, the overhead hanger 6 and the side door 2 are rotated conjointly with the rotary frame 10. Therefore, the side door 2 and the overhead hanger 6 are moved, in particular rotated, from the transfer region 11 to the application region 12 by rotating the rotary frame 10 from the first rotational position to the second rotational position.

The seal 3 is applied to the side door 2 by means of a second robot 15 while the side door 2 is supported on the overhead hanger 6 and, via the overhead hanger 6, on the rotary frame 10 and while the rotary frame 10 is in the second rotational position, that is to say while the overhead hanger 6 and the side door 2 are in the application region 12.

The respective robots 9 and 15 are preferably industrial robots having multiple robot axes which are connected to one another in an articulated manner and are also referred to as robot arms. For example, the respective robots 9 and 15 are held on the floor 14 via a base 17 of the respective robot 9 or 15, with the result that for example the respective robot axes of the respective robot 9 or 15 can be moved, in particular rotated and/or moved in translation, relative to the floor 14. For example, the robot axes can be moved in translation and/or rotated relative to one another.

In particular, it is provided that the robot 9 lifts the overhead hanger 6 together with the side door 2 held thereon out of the conveyor element 4 and lifts them or places them into the rotary frame 10. For example, first of all the overhead hanger 6 is aligned, in particular aligned in advance, on the rotary frame 10, in order that then the side door 2 can be aligned and clamped by way of its outer skin, also referred to as door outer skin. For example, the overhead hanger 6 is placed down on a centering bolt of the rotary frame, as a result of which for example the overhead hanger 6 and, by way of the latter, the side door 2 are aligned relative to the rotary frame 10 and/or relative to the floor 14 and/or in space. For example, an in particular optical sensor technical system of the rotary frame 10, the sensor technical system of which comprises for example at least one camera, in particular a 3D camera, is used to detect at least one feature, such as a fold of the side door 2, in particular optically, in particular while the side door 2 is supported on a rotary frame 10 by way of the overhead hanger 6 and in particular while the side door 2 is in the application region 12. Detecting the feature makes it possible to identify an alignment of the side door 2 in space, that is to say for example with respect to a predefinable or predefined reference position or reference alignment. For example, the side door 2 is received by the rotary frame 10 by way of its fold. For example, a holding element is moved up into a door cutout, with the result that the side door 2 is clamped by means of the holding element and thus secured relative to the rotary frame 10. In particular, the sensor technical unit of the rotary frame 10 makes it possible to ascertain an actual alignment, that is to say an actual position of the side door 2, which is secured in the actual position for example in particular relative to the rotary frame 10 and relative to the floor 14, in particular by means of the holding element, while the side door 2 is in the application region 12. The actual alignment is for example reproduced on the robot 15. In other words, it is possible for example to use the robot 15 to apply the seal 3 to the side door 2 depending on the ascertained actual alignment of the side door 2. Since the side door 2 is supported and held on the rotary frame 10 via the overhead hanger 6, a region, for example a surface region, of the side door 2 in the region of which the seal 3 is to be applied is very readily accessible, with the result that the seal 3 can be applied to the side door 2 without disruptive contours.

By means of a second conveyor element of the conveyor device 7, for example a second side door is conveyed to the removal region 5 while the second side door 2 is held on a second overhead hanger, which is separate from the second side door and separate from the second conveyor element, and is held on the second conveyor element via the second overhead hanger. By means of the first robot 9, the second overhead hanger and, via the second overhead hanger, the second side door, which is held on the second overhead hanger, are removed from the second conveyor element, which is in the removal region 5, and moved to the rotary frame 10, in particular while the rotary frame 10 is in the second rotational position. By means of the first robot 9, the second overhead hanger and, via the second overhead hanger, the second side door, which is held on the second overhead hanger, are supported on the rotary frame 10 and thus disposed in the region B2 while the rotary frame 10 is in the second rotational position and while the seal 3 is applied to the side door 2 by means of the second robot 15. Therefore, the second overhead hanger and the second side door are first of all disposed in the transfer region 11.

After the seal 3 has been applied to the side door 2, the rotary frame 10 and, by means of the latter, the overhead hanger 6, the second overhead hanger, the side door 2 and the second side door are rotated from the second rotational position to the first rotational position by rotating the rotary frame 10 in particular by 180 degrees about the axis of rotation 13 relative to the floor 14. As a result, the overhead hanger 6 and the side door 2 are moved, in particular rotated, from the application region 12 to the transfer region 11, and the second overhead hanger and the second side door are moved or rotated from the transfer region 11 to the application region 12. By means of the first robot 9, the overhead hanger 6 and, via the overhead hanger 6, the side door 2, which is held on the overhead hanger 6 and to which the seal is applied, are then removed from the rotary frame 10, which is in the first rotational position, and thus moved from the transfer region 11 to the first conveyor element 4, which is in a return region 16 different than the removal region 5, in particular while a second seal is applied to the second side door by means of the second robot 15. The second seal is applied to the second side door by means of the second robot 15 while the second side door is held on the second overhead hanger and, via the second overhead hanger, on the rotary frame 10, while the rotary frame 10 is in the first rotational position and while the second side door and the second overhead hanger are in the application region 12.

By means of the first robot 9, the overhead hanger 6 and, via the overhead hanger 6, the side door 2, which is held on the overhead hanger 6 and to which the seal is applied, are disposed on the first conveyor element 4, in particular so as to be reversibly detachable, while the first conveyor element 4 is in the return region 16. For example, the overhead hanger 6 is suspended from or in the conveyor element 4 again and thus connected to the conveyor element 4 so as to be nondestructively detachable. Then, the side door 2 provided with the seal 3 and the overhead hanger 6 are conveyed from the return region 16 to yet another region of the plant 1 by means of the conveyor element 4.

It is evident that the seal 3 is applied to the side door 2 by means of the robot 15 while the region B1 and thus a first side of the rotary frame 10 face toward the robot 15 or are disposed in the application region 12 and while the rotary frame 10 is charged with the second overhead hanger and the second side door, and therefore while the second region B2 and thus a second side, facing away from the first side, of the rotary frame 10 face toward the robot 9 and/or the second conveyor element or are disposed in the transfer region 11. Moreover, the side door 2 with the seal 3 is removed from the rotary frame 10 while for example the second side door is provided with the second seal in the application region 12. After for example the side door 2 with the seal 3 has been removed from the rotary frame 10 by means of the robot 9, it is possible for example by means of the robot 9 to dispose a third side door in the region B1 by way of a third overhead hanger, whereupon the third side door, like the first side door 2 previously, can be provided with a third seal.

After the second seal has been applied to the second side door, the rotary frame 10 and thus the second overhead hanger and the second side door are rotated from the first rotational position to the second rotational position, as a result of which the second side door and the second overhead hanger are moved from the application region 12 back to the transfer region 11. By means of the first robot 9, the second overhead hanger and, via the second overhead hanger, the second side door, which is held on the second overhead hanger and to which the second seal is applied, are then removed from the rotary frame 10, which is in the second rotational position, and thus moved from the transfer region 11 to the second conveyor element, which is in the return region 16.

By means of the first robot 9, the second overhead hanger and, via the second overhead hanger, the second side door, which is held on the second overhead hanger and to which the second seal is applied, are disposed on the second conveyor element, and therefore connected to the second conveyor element so as to be nondestructively detachable, while the second conveyor element is in the return region 16. After this, the second overhead hanger and the second side door of the second conveyor element can also be conveyed from the return region 16 to the further region relative to the floor 14.

Overall, it is evident that the plant 1 and the method make it possible to apply seals to side doors particularly favorably in terms of time and costs. Since the respective side door is not handled by means of a respective special gripper, which is held and remains on the respective robot 9 or 15, but rather by way of the overhead hanger assigned to the respective side door, it is possible to apply the seals without grippers.

LIST OF REFERENCE CHARACTERS

1 Plant
2 Side door

3 Seal
4 Conveyor element
5 Removal region
6 Overhead hanger
7 Conveyor device
8 Arrow
9 First robot
10 Rotary frame
11 Transfer region
12 Application region
13 Axis of rotation
14 Floor
15 Second robot
16 Return region
17 Base
18 Manipulator
B1 First region
B2 Second region

The invention claimed is:

1. A method for applying a seal to a component for a vehicle, comprising the steps of:
conveying a first component to a removal region by a first conveyor element while the first component is held on a first holding element, wherein the first holding element is separate from the first component and separate from the first conveyor element, and is held on the first conveyor element via the first holding element;
by a first robot, the first holding element and, via the first holding element, the first component held on the first holding element are removed from the first conveyor element, which is in the removal region, and moved to a rotary frame;
by the first robot, the first holding element and, via the first holding element, the first component held on the first holding element are supported on the rotary frame and as a result are disposed in a first region of the rotary frame while the rotary frame is in a first rotational position;
rotating the rotary frame and thus the first holding element and the first component from the first rotational position to a second rotational position; and
applying a first seal to the first component by a second robot while the first component is supported on the first holding element and, via the first holding element, on the rotary frame and while the rotary frame is in the second rotational position.

2. The method according to claim 1, further comprising the steps of:
conveying a second component to the removal region by a second conveyor element while the second component is held on a second holding element, wherein the second holding element is separate from the second component and separate from the second conveyor element, and is held on the second conveyor element via the second holding element;
by the first robot, the second holding element and, via the second holding element, the second component held on the second holding element are removed from the second conveyor element, which is in the removal region, and moved to the rotary frame; and
by the first robot, the second holding element and, via the second holding element, the second component held on the second holding element are supported on the rotary frame and as a result are disposed in a second region, opposite the first region, of the rotary frame while the rotary frame is in the second rotational position and while the first seal is applied to the first component by the second robot.

3. The method according to claim 2, further comprising the steps of:
after the first seal has been applied to the first component, rotating the rotary frame from the second rotational position to the first rotational position; and
applying a second seal to the second component by the second robot while the second component is supported on the second holding element and, via the second holding element, on the rotary frame and while the rotary frame is in the first rotational position.

4. The method according to claim 3, further comprising the steps of:
by the first robot, the first holding element and, via the first holding element, the first component, which is held on the first holding element and to which the first seal is applied, are removed from the rotary frame, which is in the first rotational position, and moved to the first conveyor element, which is in a return region different than the removal region, while the second seal is applied to the second component by the second robot; and
by the first robot, the first holding element and, via the first holding element, the first component, which is held on the first holding element and to which the first seal is applied, are disposed on the first conveyor element while the first conveyor element is in the return region.

5. The method according to claim 4, wherein the first conveyor element is moved horizontally from the removal region to the return region.

6. The method according to claim 4, further comprising the steps of:
after the second seal has been applied to the second component, the rotary frame and thus the second holding element and the second component are rotated from the first rotational position to the second rotational position;
by the first robot, the second holding element and, via the second holding element, the second component, which is held on the second holding element and to which the second seal is applied, are removed from the rotary frame, which is in the second rotational position, and moved to the second conveyor element, which is in the return region different than the removal region; and
by the first robot, the second holding element and, via the second holding element, the second component, which is held on the second holding element and to which the second seal is applied, are disposed on the second conveyor element while the second conveyor element is in the return region.

7. The method according to claim 1, wherein the rotary frame is rotated by at least 90 degrees in order to rotate the rotary frame from the first rotational position to the second rotational position and from the second rotational position to the first rotational position.

8. The method according to claim 1, wherein the first component is a door.

9. The method according to claim 1, wherein the rotary frame is rotated about a vertical axis of rotation in order to rotate the rotary frame from the first rotational position to the second rotational position and from the second rotational position to the first rotational position.

10. A plant for applying a seal to a component for a vehicle, wherein the plant performs the method according to claim 1.

* * * * *